United States Patent
Kay et al.

(10) Patent No.: US 8,266,544 B1
(45) Date of Patent: Sep. 11, 2012

(54) HTML POP-UP CONTROL (75) Inventors: Erik Kay, Belmont, CA (US); Aaron Boodman, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/246,276

(22) Filed: Sep. 27, 2011

Related U.S. Application Data (63) Continuation of application No. 13/110,770, filed on May 18, 2011.

(60) Provisional application No. 61/346,013, filed on May 18, 2010, provisional application No. 61/346,000, filed on May 18, 2010, provisional application No. 61/345,999, filed on May 18, 2010.

(51) Int. Cl.
   *G06F 3/048* (2006.01)
(52) U.S. Cl. .......................... 715/808; 715/760; 715/800
(58) Field of Classification Search .................. 715/205, 715/234, 243, 247, 249, 252, 760, 764, 765, 715/800, 808
See application file for complete search history.

(56) References Cited

U.S. PATENT DOCUMENTS

| | | | |
|---|---|---|---|
| 2006/0212803 A1* | 9/2006 | Arokiaswamy | 715/520 |
| 2008/0120534 A1* | 5/2008 | Moore | 715/243 |
| 2008/0235594 A1* | 9/2008 | Bhumkar et al. | 715/738 |

OTHER PUBLICATIONS

Perfect Popups, "Perfect Popups.pdf", Jan. 20, 2010, 13 pages.*

* cited by examiner

*Primary Examiner* — Haoshian Shih
(74) *Attorney, Agent, or Firm* — Brake Hughes Bellermann LLP

(57) ABSTRACT

A computer-implemented method includes setting minimum boundaries for a pop-up window based on content, displaying the content in the pop-up window, receiving an input to change a layout of the content, calculating new minimum boundaries for the pop-up window based on the layout change, resizing the pop-up window using the new minimum boundaries and displaying the content in the resized pop-up window.

21 Claims, 7 Drawing Sheets

```
{
  "name": "My extension",
  ...
  "browser_action": {
    "default_icon": "images/icon19.png" ,   //optional
    "default_title": "Google Mail",          //optional
    "default_popup": "popup.html"            //optional
  },
  ...
}
```

HTML POP-UP CONTROL

CROSS-REFERENCE TO RELATED APPLICATIONS

This application is a continuation application of prior application Ser. No. 13/110,770, filed on May 18, 2011, titled "HTML POP-UP CONTROL," which claims the benefit, under 35 U.S.C. §119, of U.S. Provisional Patent Application No. 61/345,999, filed May 18, 2010, (titled "Installable Web Applications"), U.S. Provisional Patent Application No. 61/346,000, filed May 18, 2010, (titled "Web Store for Digital Goods"), and U.S. Provisional Patent Application No. 61/346,013, filed May 18, 2010, (titled, "Chrome Extensions"). The disclosures of all of these patent applications are incorporated herein by reference in their entirety.

TECHNICAL FIELD

This description relates to an hypertext mark-up language (HTML) pop-up control that automatically sizes a pop-up window based on the window contents.

BACKGROUND

Browsers typically enable users to interact with and experience many different types of content, usually over a computer network, and often in a visual or graphical manner. For example, users may install one or more internet browsers on a local computing device, and may thereafter utilize the internet browser to access content and/or functionality provided by a remote computing device.

SUMMARY

According to one general aspect, a computer-implemented method includes setting minimum boundaries for a pop-up window based on content, displaying the content in the pop-up window, receiving an input to change a layout of the content, calculating new minimum boundaries for the pop-up window based on the layout change, resizing the pop-up window using the new minimum boundaries and displaying the content in the resized pop-up window.

In another general aspect, a computer-readable storage medium has recorded and stored thereon instructions that, when executed by a processor, cause the processor to perform a method, where the method includes setting minimum boundaries for a pop-up window based on content, displaying the content in the pop-up window, receiving an input to change a layout of the content, calculating new minimum boundaries for the pop-up window based on the layout change, resizing the pop-up window using the new minimum boundaries and displaying the content in the resized pop-up window.

In another general aspect, an apparatus includes instructions stored on a computer-readable storage medium and executable by at least one processor to execute a browser application and thereby provide a browser interface, where the apparatus includes a rendering engine configured to cause the at least one processor to set minimum boundaries for a pop-up window based on content and to display the content in the pop-up window and an input interface configured to cause the at least one processor to receive an input to change a layout of the content. The rendering engine is configured to cause the at least one processor to calculate new minimum boundaries for the pop-up window based on the layout change, resize the pop-up window using the new minimum boundaries and display the content in the resized pop-up window.

Implementations of each of the general aspects may include one or more of the following. For example, the content may include content received from an application installed in a browser application. The minimum boundaries and the new minimum boundaries for the pop-up window may be limited to maximum boundaries for the pop-up window. The resizing of the pop-up window and displaying the content in the resized pop-up window may be animated at a same time. Calculating the new minimum boundaries may include populating the content in a non-displayed view to determine at the new minimum boundaries. Receiving the input to change the layout of the content may include receiving a selection to expand content associated with a hyperlink. The minimum boundaries and the new minimum boundaries may constrain a size of the pop-up window in two dimensions.

The details of one or more implementations are set forth in the accompanying drawings and the description below. Other features will be apparent from the description and drawings, and from the claims.

DETAILED DESCRIPTION

This document relates to systems and techniques for automatically sizing a pop-up window based on the window contents. An HTML pop-up control automatically sizes a pop-up window to an ideal minimum size based on the contents and automatically resizes the pop-up window as the contents dynamically change. In this manner, a developer for an application that is to be installed in browser application does not need to specify any boundaries or any of a pop-up window that is part of the application. Instead, the pop-up window, which may be invoked by a user action, automatically sizes itself based on the content that is to be populated within the pop-up window.

With a pop-up window that is automatically sized and re-sized based on dynamically changing content, developers don't need to worry about complex issues related to determining a size or a default size for a pop-up window. For instance, a developer does not need to worry about complex issues related to internationalization of content from one language to another language. For instance, text that may be translated from German to French or from one language to another language may be done so without regard to setting default sizes for the pop-up window, including a height and a width, for the pop-up window. Instead, the pop-up window will automatically size itself to an ideal minimum size in order to appropriately display the translated content.

Throughout this document, the terms browser and browser application may be used interchangeably to mean the same thing. Also throughout this document, the terms web application and web app may be used interchangeably to refer to an application, including metadata, that is installed in a browser application. The terms extension application, web extension, web extension application, extension app and extension may be used interchangeably to refer to a bundle of files that are installed in the browser application to add functionality to the browser application. The term application, when used by itself without modifiers, may be used to refer to a web application and/or an extension application that is installed or is to be installed in the browser application.

An extension application may be a zipped bundle of files that adds functionality to the browser application. Extension applications may be webpages and may use all of the application programming interfaces (APIs) that the browser application provides to webpages. The extension application may include hypertext mark-up language (HTML), cascading style sheets (CSS), JavaScript, images, and other types of files and web-related computer languages and code.

In one exemplary implementation, an extension application may use a background element, which is an invisible element that may include the main logic or instructions related to the extension application. In this manner, the background element may function as a central hub for the functionality of the extension application. The background element may be associated with one or more visible elements of the extension application. Upon the launch or a triggering event such as, for example, logging into a computer or logging the browser application or launching the extension application, the background element launches and begins executing the instructions contained within the background element. In this manner, the extension application provides quick and fast access to content due to the fact that the background element is operating even when the visible elements of the extension are not being displayed. Upon invocation of a visible element of the extension, the background element provides content and information that has been collected in the background.

In another example, an installed application may be an installed web application. A web application may be a normal website that includes extra metadata that is installed as part of the browser application. Installable web apps may use standard web technologies for server-side and client-side code. The extra metadata associated with the installable web application affects the web application's interaction with the browser application. The web application also may be associated with a background element that is an invisible element in the browser application that includes instructions related to one or more visible elements of the web application in the browser application. Upon the triggering of an event such as, for example, launching the browser application or opening the web application, the background element may execute the instructions on its page to perform functions related to the one or more visible elements of the installable web application.

Figure 1:
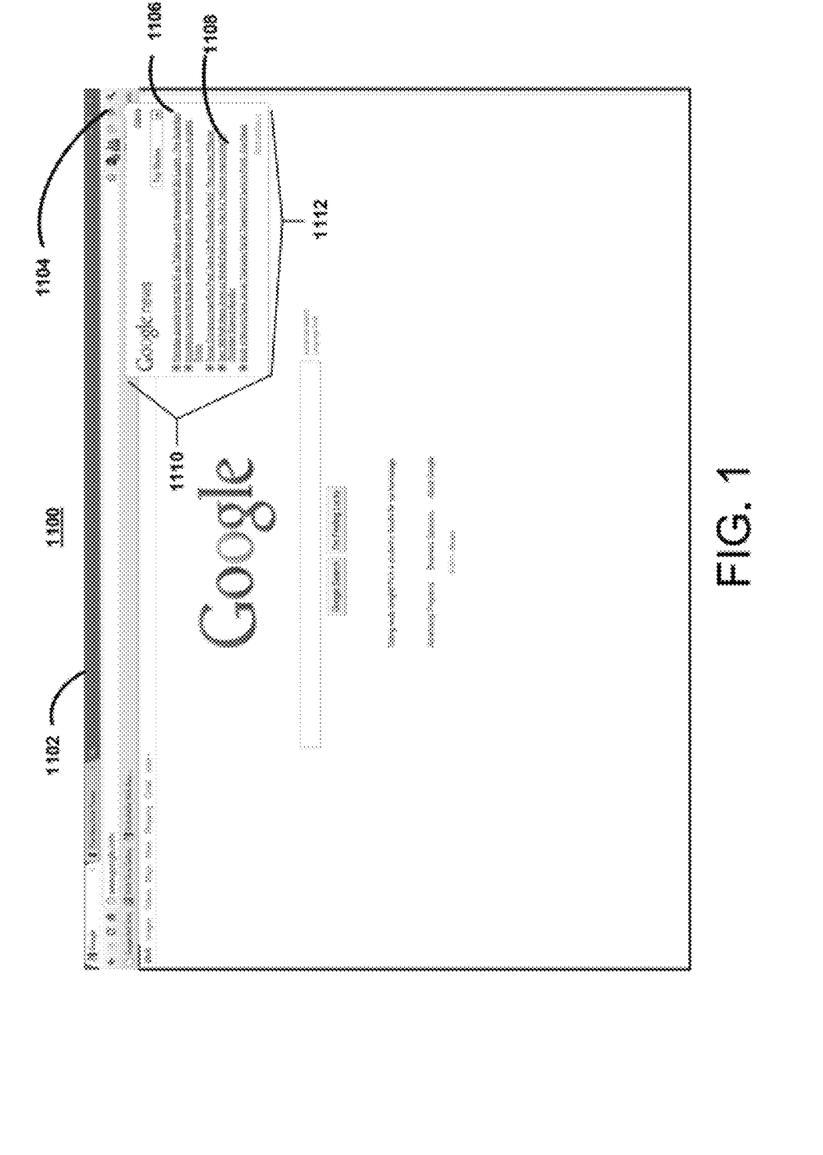
FIG. 1 is an exemplary screen shot of a web page in a browser application.

Referring to FIG. 1, an exemplary screenshot 1100 is illustrated. The screenshot 1100 illustrates an exemplary illustration of a browser application 1102. For example, in one exemplary implementation, the browser application 1102 may be the Google Chrome browser application. One type of extension application that may be installed as part of the browser application 1102 may be referred to as a browser action. A browser action, such as browser action 1104, may be installed in the browser application 1102. An icon for the browser action 1104 may appear in the main toolbar, to the right of the address bar. In other example, the icon may be located in other locations in the browser application. In addition to its icon, a browser action also may include a tooltip, a badge, and a pop-up window. As discussed above, the extension application, which in this instance is implemented as a browser action, may be associated with a background element that provides the functionality for the operation of the extension application.

In this example, when a user selects the extension application 1104, a pop-up window 1106 is displayed. The pop-up window 1106 is populated with content as specified by the extension application and the instructions contained in its associated background element. For instance, in the example of the Google News extension application, the background element may receive content from a website associated with the Google News in order to populate the pop-up window 1106.

The pop-up window 1106 may be constrained and defined in two dimensions by its boundaries 1110 and 1112. One of the boundaries may be a minimum height 1110 and the other boundary may be a minimum width 1112. The content defines and determines the minimum size of the boundaries, including the minimum height 1110 and the minimum width 1112.

Minimum boundaries are set for the pop-up window 1106 based on the content. For instance, if more content is to be displayed, then a larger sized pop-up window having increased minimum boundaries 1110 and 1112 may be generated and populated with the content. Conversely, content that has less information may result in a smaller pop-up window 1106 having minimum boundaries that are smaller than those shown in this example.

An ideal minimum height and minimum width combination are calculated in order to provide a compact presentation. The ideal minimum height and minimum width combination is automatically calculated based on the size and scope of the content rather than using manual sizing. In this manner, a developer does not need to manually size the pop-up window 1106. This enables a developer to concentrate on populating the window with the best content possible knowing that the content will be displayed in an appropriately sized window.

A user may select one of the links in the pop-up window 1106. The selection may be made, for example, by using a mouse or other input device or the selection may be made by simply causing a cursor or other pointing device to hover over the link. In this example, a user may select the link 1108. In response to receiving an input, such as a selection of a link, the layout of the content in the pop-up window 1106 may change.

Figure 2:
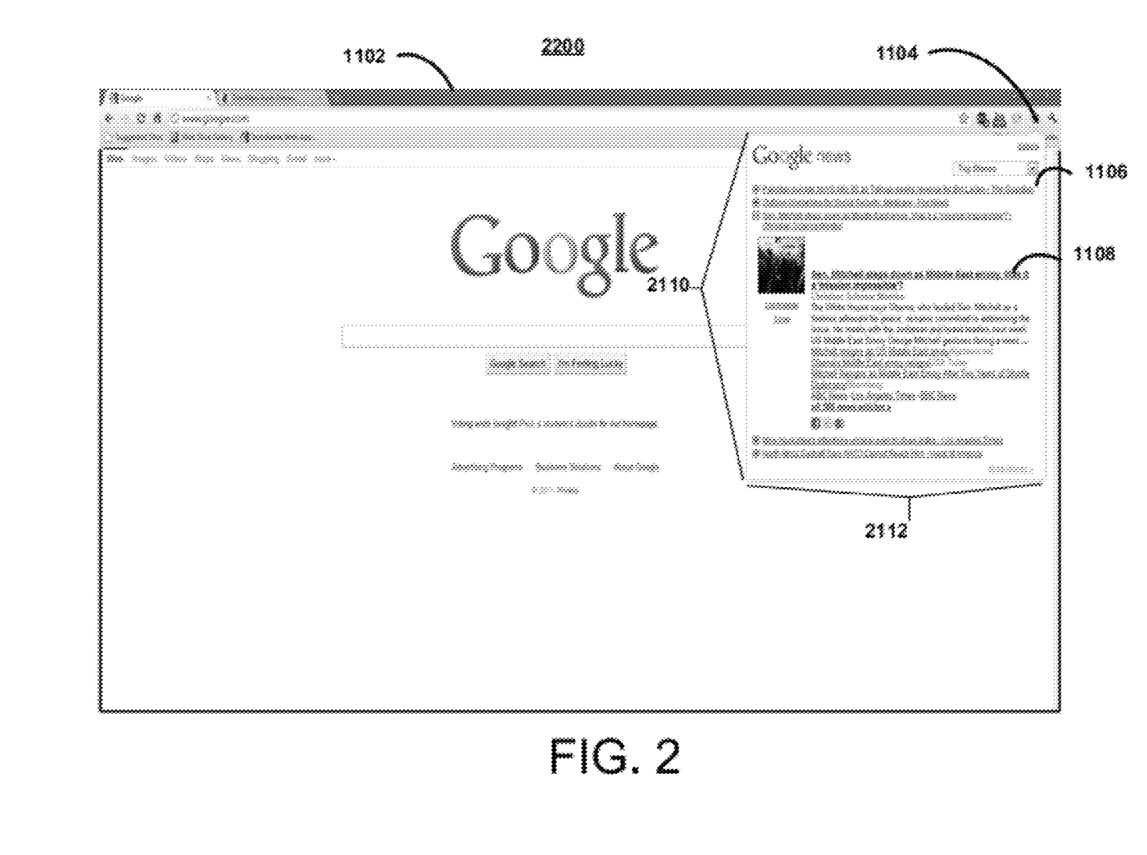
FIG. 2 is an exemplary screen shot of a web page and a pop-up notification in a browser application.

Referring to FIG. 2, an exemplary screenshot 2200 is illustrated. In this exemplary screenshot 2200, the browser application 1102 illustrates a resized pop-up window 1106 following the selection of the link 1108. New minimum boundaries 2110 and 2112 for the pop-up window 1106 are calculated based on the layout change. The pop-up window 1106 is resized using the new minimum boundaries 2110 and 2112. In this example, the layout change of the content caused the minimum height 1110 from FIG. 1 to increase in size to a new minimum height of 2110. The change in layout of the content may cause a change in the minimum height and/or the minimum width. Thus, the pop-up window may be resized in one or two dimensions. The expanded content is displayed in the resized pop-up window 1106.

The resizing and calculation of the new minimum boundaries for the pop-up window may take into account the type of content being displayed with the layout change. For example, the type of content in the expanded link may include one or more images, multiple additional links to other content, icons, other links, and text description associated with one or more of the links. Other types of content also may be included such as, for example, video windows, and other active content, all of which may affect the sizing of the pop-up window.

A selection of a different link within the pop-up window 1106 may cause the layout of the content to change once again. For example, a selection of a link other than 1108 may cause the content associated with the other link to expand and, at or near a same time, cause the expanded content associated with the link 1108 to contract. In this example, new minimum boundaries for the pop-up window may be calculated based on the layout change of the expanding other link and the contracting link 1108.

Although not illustrated in this example, more than one link may be expanded and shown simultaneously. In the case of more than one link being expanded, the pop-up window 1106 may be automatically resized to accommodate a compact and complete display of all expanded links.

In one exemplary implementation, a CSS transition may be used to automatically animate the expansion of the pop-up window 1106. For instance, when a link is selected that causes a change in the layout of the content, then the transition may animate the resizing of the pop-up window as the content is expanded. In a similar manner, if the same link is selected again, the content may contract. The content may contract using a CSS transition to automatically animate the contraction of the pop-up window. The expansion and contraction of the content causes a recalculation of the minimum boundaries 2110 and 2112 and correspondingly the resizing of the pop-up window 1106.

Figure 3:
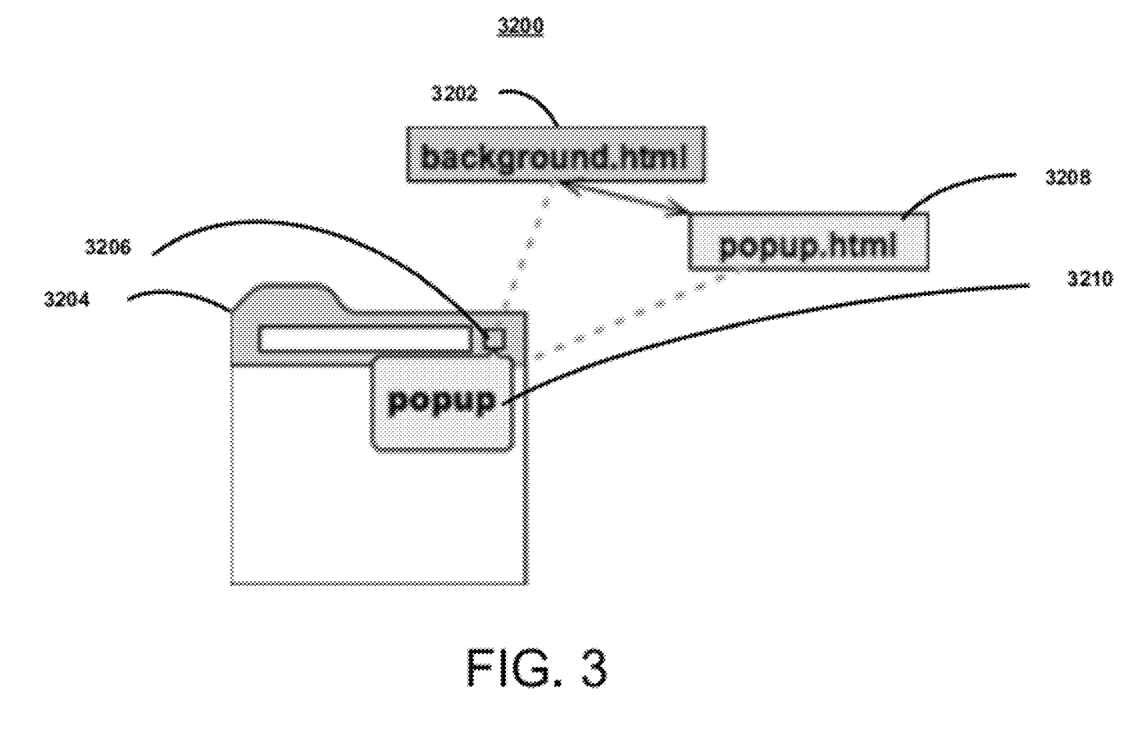
FIG. 3 is an exemplary schematic of a web page and a pop-up window in a browser application.

Referring to FIG. 3, an exemplary schematic 3200 illustrates a browser application. In the example schematic of the browser application 3200, a background element 3202 may be provided. The background element 3202 is invisible in the browser application such that a user may not view the contents or the instructions included in the background element 3202. Instead, the invisible background element 3202 is associated with a visible element 3204 of the browser application. In this example, the window 3204, which is a window in the browser application includes an extension application 3206 that is installed in the browser application.

In this example, the extension application 3206 is associated with both a background page 3202 and a pop-up page 3208. The pop-up page 3208 is implemented by an HTML file (e.g., popup.html). Also, for example, extension applications may use other means and implementations to display HTML files that are part of the extension application. For example, extensions also may use chrome.tabs.create( ) or window.open( ) to display HTML files that are in the extension. The HTML pages inside an extension may include complete access to each other's DOMs and those HTML pages may invoke functions on each other.

In this example, the architecture of the browser actions pop-up is illustrated. The contents of the pop-up window 3210 are a webpage defined by the popup element 3208, which is an HTML file called popup.html file. The pop-up doesn't need to duplicate code that's in the background page 3202 because the pop-up element 3208 may invoke functions on the background element 3202. Similarly, the background element 3202 may invoke functions on the pop-up element 3208. In this example, the pop-up window 3210 that is made visible in the browser application may be considered a dumb view. The dumb view does not update itself directly from the remote servers. Instead, when the view needs some state, it requests the state from the background element 3202. Also, when the background element 3202 notices a state change, the background element 3202 provide the state information to the popup window 3210 without first receiving a request.

In this example, the popup element 3208 may not define minimum or maximum boundaries for the height and width of the pop-up window 3210. Instead, the minimum boundaries for the pop-up window 3210 may be dynamically calculated and sized based on the content received from the popup element 3208. The minimum boundaries of the pop-up window 3210 may automatically and dynamically change in response to the content changing with the pop-up window 3210.

Figure 4:
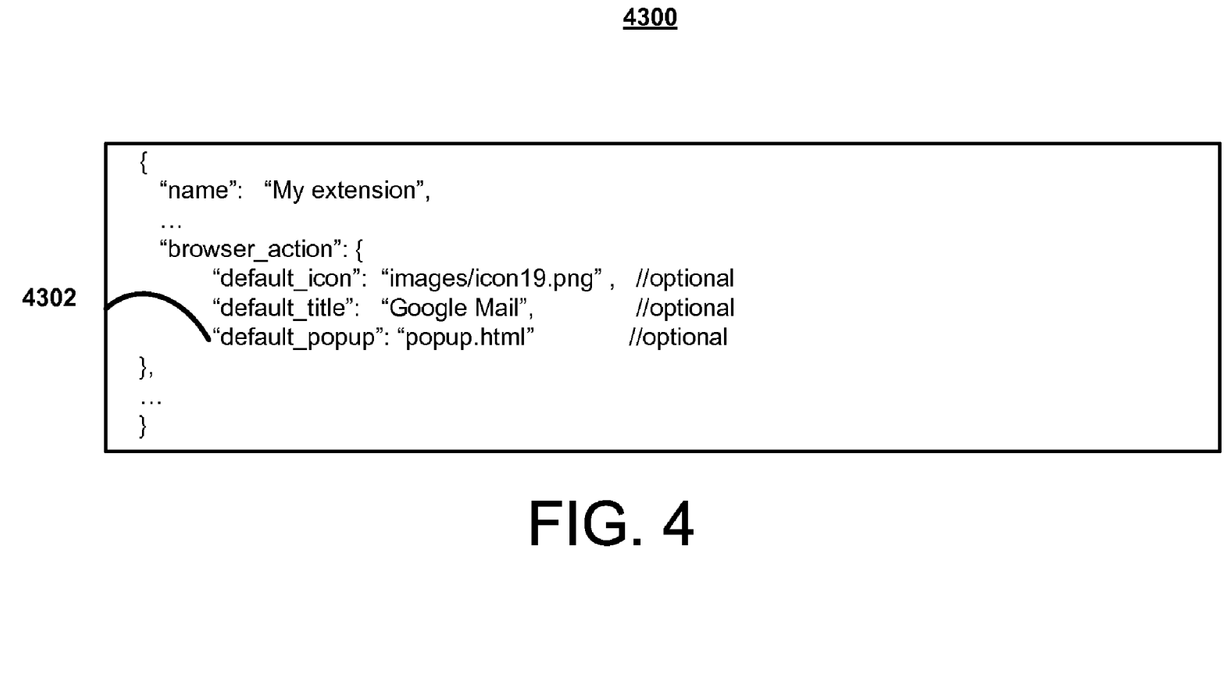
FIG. 4 is an exemplary file containing an exemplary code snippet.

Referring to FIG. 4, an exemplary file 4300 containing a code snippet is illustrated. The file 4300 may be referred to as a manifest or a manifest file and may contain metadata associated with a web application or an extension application. The manifest file may include one or more fields that specify information related to the application.

In this example, the manifest file 4300 relates to registering a browser action that is part of an extension application. The manifest file includes fields related to the browser action including an icon field, a title field and a pop-up field. A browser action icon may be up to a number of pixels wide and high. For example, an icon may be 19 pixels wide and high for ideal display results in a browser application toolbar. Larger icons may be resized to fit within a toolbar of the browser application. The icon may be set in multiple different ways. For example, a static image may be used or an HTML5 canvas element may be used. Using static images may be easier for simple applications but other applications may include more dynamic interfaces for the icons such as smooth animation. To set the icon, a default_icon field may be used in the manifest file 4300.

A tooltip may be associated with the icon such that when a user action causes a pointer to hover over the icon the text associated with the tooltip will be displayed to the user. To set the tooltip the default_title field may be used in the manifest file 4300. Local-specific strings also may be specified for the default_title field.

The manifest file 4300 also may include a field related to a pop-up window associated with the extension application. The pop-up field may include any HTML content desired by the developer. The content may be specified by an HTML file and the HTML file may be specified in the default_pop-up field 4302 in the manifest file 4300. The pop-up field 4302 may specify a location as to where the pop-up window is to retrieve content from. For example, the location may refer to a website on one or more remote servers.

Figure 5:
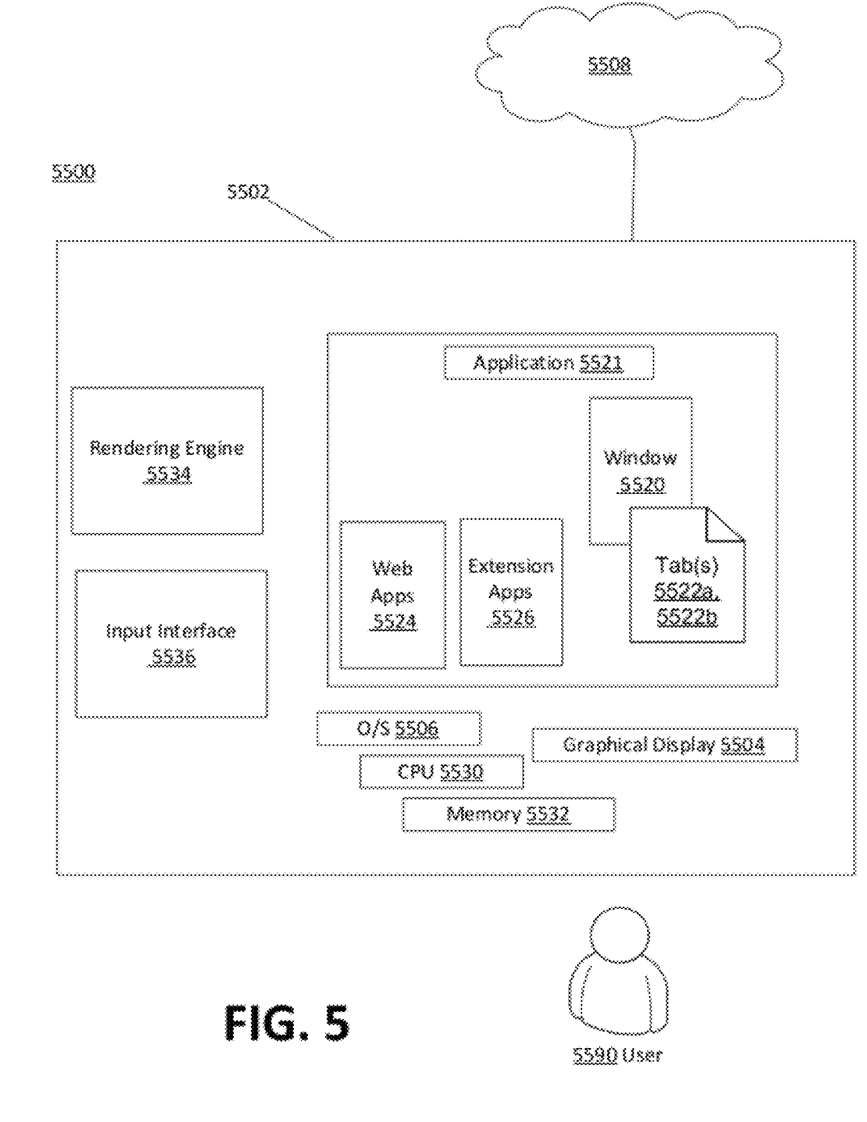
FIG. 5 is an exemplary block diagram of a system.

FIG. 5 is a block diagram of an example embodiment of a system 5500 in accordance with the disclosed subject matter. In various implementations, the system 5500 may include a client computer or other computing device (e.g., smartphone, tablet computer, laptop, etc.) 5502 that executes an operating system 5506, and an application 5521 or window 5520. In one embodiment, the computer may include or be connected to a graphical display 5504 (e.g., a monitor, touchscreen, etc.) and receive input, at least in part, from a user 5590 interacting with the device 5502.

In one exemplary implementation, the device 5502 may be running or causing the operating system 5506 to execute the application 5521 or the window 5520. For purposes of illustration, the application 5521 may be a browser application that includes at least one window 5520. In various implementations, this window 5520 may include multiple panes or tabs 5522a, 5522b. The device 5502 may receive online content from one or more remote server computing devices (not shown) that may be connected to the client device 5502 though a network 5508 such as, for example, the Internet. The online content can be processed and displayed on the graphical display 5504 on a tab 5522a or 5522b in the browser application 5521.

The user 5590 may navigate to a web store on the Internet and download one or more web applications 5524 and/or extension applications 5526 to install in the browser application 5521. Prior to the installation of a web application 5524 or an extension application 5526, the browser application 5521 presents a notification that includes a request to confirm the installation of the application and that includes a listing of any permissions that are declared by the application. Upon receiving confirmation of the installation, the application is installed and the permissions are granted.

A memory 5532, or other non-transitory computer-readable storage medium, may store instructions and code that are executed by at least one processor 5530. The instructions may include any instructions or code related to the browser application 5521 and the process of installing applications in the browser application, including the notification and granting of permissions associated with the applications. The processor 5530 may execute any code or instructions provided on any background element associated with a web application and/or an extension application.

The browser application also may include a rendering engine 5534. In one exemplary implementation, the rendering engine 5534 is associated and part of the code associated with the browser application 5521. In other exemplary implementations, the rendering engine 5534 may be a separate component that interacts with the browser application 5521.

The rendering engine may be configured to cause the at least one processor 5530 to set minimum boundaries for a pop-up window based on content and to display the content in the pop-up window such as, for example, on a graphical display 5504 used to display the browser application 5521 and the associated windows, tabs, and content.

The input interface 5536 may be associated with the browser application 5521 and may be a component of the browser application 5521. In other implementations, the input interface 5536 may be associated with the operating system 5506 and the device 5502 and may interact with the browser application 5521.

The input interface 5536 may be configured to receive input from one or more input devices available to a user 5590. Input interface may be configured to cause the at least one processor 5530 to receive an input to change a layout of a content. For example, the input interface 5536 may cause the processor 5530 to receive a selection from a user of a link in the content in the pop-up window. In response to receiving the input to change the layout of the content, the rendering engine 5534 is configured to cause the processor 5530 to calculate new minimum boundaries for the pop-up window based on the layout change.

For example, the rendering engine 5534 may work with the processor 5530 to populate the content in a non-displayed view to determine the new minimum boundaries. The non-displayed view may be a hidden or invisible background view that is used by the rendering engine 5534 to lay out new content and determine an appropriate size of the pop-up window, including a new minimum height and/or a new minimum width. Once the new minimum bandwidths are calculated, the pop-up window is resized by the rendering engine using the new minimum boundaries. Additionally, the content is displayed by the rendering engine in the resized pop-up window.

As discussed above, the rendering engine 5534 may cause the processor 5530 to animate the resizing of the pop-up window as content and the layout of the content is dynamically changed. The layout of the content may change as user inputs are received by the input interface 5536 including actions such as selection of links to either expand or contract the links and selection of other content including active content within the pop-up window.

In one exemplary implementation, the rendering engine 5534 is configured to cause the processor 5530 to limit the minimum boundaries and any newly calculated minimum boundaries for the pop-up window and a resized pop-up window to maximum boundaries for the pop-up window. In this manner, content that is selected by the user that is deemed to otherwise expand the size of the pop-up window beyond an ideal size, the size is limited to a maximum size of the pop-up window. The maximum size may include maximum boundaries for the height and the width such that the minimum ideal boundaries do not exceed the maximum boundaries. The maximum boundaries may be set according to code or instructions that are part of the browser application 5521. Code related to an extension application 5526 and an associated pop-up window does not need to code related to maximum boundaries for any pop-up window.

Figure 6:
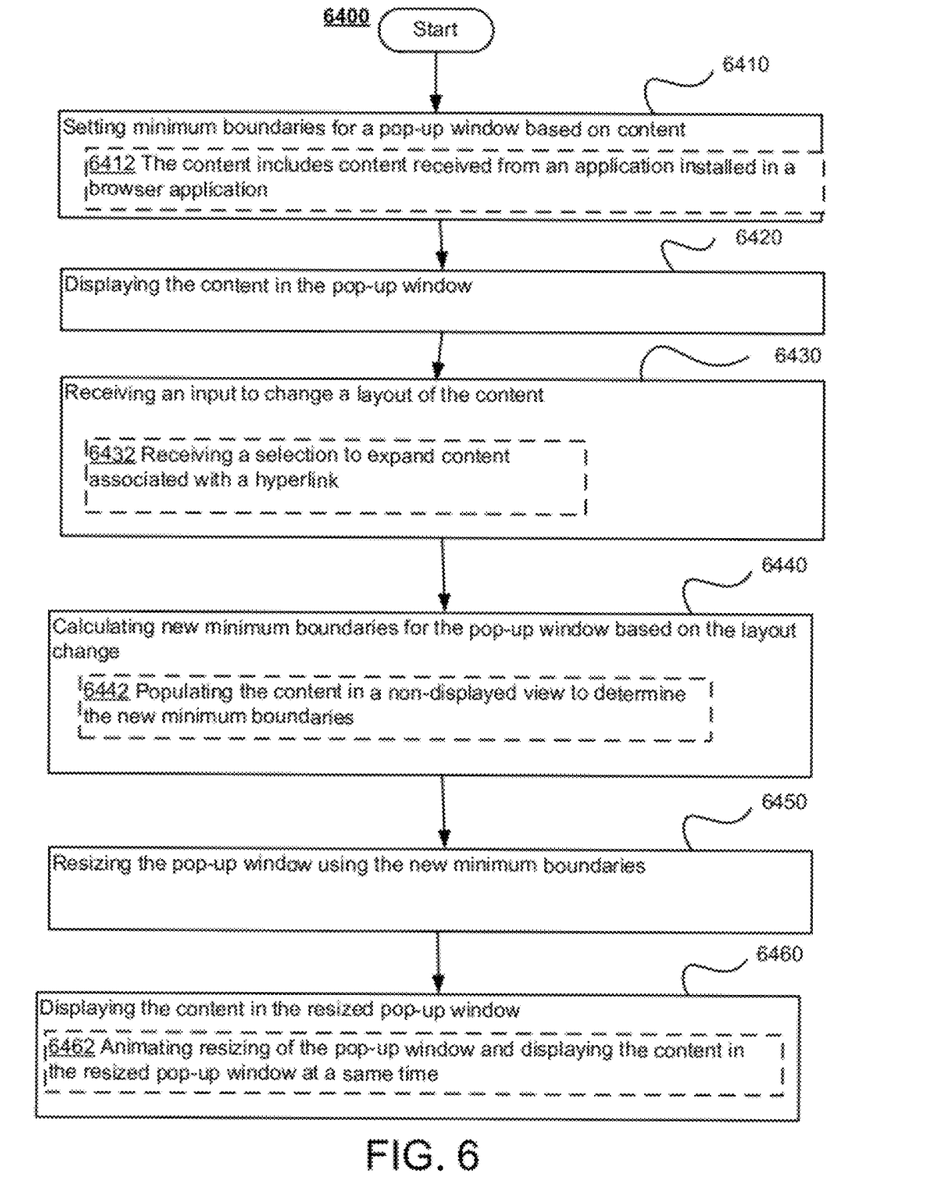
FIG. 6 is a flowchart illustrating example operations of the system of FIG. 5.

Referring to FIG. 6, an exemplary process 6400 is illustrated. Minimum boundaries for a pop-up window may be set based on the content (6410). For example, content associated with a pop-up window, which may be retrieved from an HTML file associated with an extension application or a web application may be used to set the minimum boundaries for the pop-up window. The minimum boundaries for the pop-up window may be selected such that the content, which may change over time, is displayed in an ideal and presentable window to the user. The content may include content received from an application installed in a browser application (6412).

The process 6400 also includes displaying the content in the pop-up window (6420). In this manner, the content associated with an application installed in the browser application may be displayed in the pop-up window.

The process 6410 also includes receiving an input to change a layout of the content (6430). Receiving input to change the layout may include receiving a selection to expand content associated with a hyperlink (6432). For example, a user may use one or more input devices to interface with the browser application and to select content displayed in the pop-up window. The input received in the pop-up window may cause a change in the layout of the content such as when a link is selected and content associated with the link is expanded for display to the user within the pop-up window. Other received inputs may cause a change in the layout of the content by contracting an expanding link, activating or deactivating active content, expanding or contracting content associated with more than one hyperlink.

The process 6400 includes calculating new minimum boundaries for the pop-up window based on the layout change (6440). Calculating the new minimum boundaries may include populating the content in a non-displayed view to determine the new minimum boundaries (6442). The minimum boundaries and the new minimum boundaries may constrain a size of the pop-up window in multiple dimensions and not just in one dimension. For instance, the minimum boundaries and the new minimum boundaries may constrain a size of the pop-up window in both height and width.

Process 6400 includes resizing the pop-up window using the new minimum boundaries (6450). Content is then displayed in the resized pop-up window (6460). As discussed above, the resizing of the pop-up window and displaying of the content may be animated such that the resizing and displaying of the content is done at a same time in an automatically animated manner (6462).

In one exemplary implementation, the minimum boundaries and new minimum boundaries may be calculated (e.g., by the rendering engine) by using a minimum preferred width and a document scroll height for the pop-up window. The minimum preferred width may be the width that the HTML content would be if it is made as small as possible without needing a horizontal scrollbar to show content. For example, in a paragraph of text, the minimum preferred width may be the width of the longest individual word. Other elements in the content (e.g., images and tables) that do not wrap also factor into calculating the minimum preferred width. For instance, the size of the largest non-wrapping element factors into the minimum preferred width. Also, other content elements that include certain CSS elements and HTML attributes may specify minimum or fixed sizes for specific content elements. These and other content elements may factor into the calculation of the minimum preferred width.

The document scroll height may be the actual current height of the content area within its scroll view given its current width. In one exemplary implementation, the minimum boundaries may be calculated as follows. For instance, the pop-up window size is first set to 0 pixels by 0 pixels. The content (e.g., HTML content) is loaded into the pop-up window. The minimum preferred width is calculated and as it is being calculated and changes, a notification may be posted indicating that the content size has changed and indicating a current minimum preferred width. Based on the content, a minimum preferred width and its associated scroll height is determined and compared to a preferred size, for example, that does not include any scroll bars. If the minimum preferred width and the scroll height match the preferred size, then the pop-up window is notified of the new preferred size. If at any time the width changes, then the height will not be correct because the height is based on the current height and not the preferred height. The pop-up window size is set to the minimum of the maximum allowed pop-up boundaries (or dimensions) and the new preferred size. If no actual size change occurred, the content is displayed in the pop-up window. If an actual size change occurs, then the rendering engine lays out the content in the newly sized window and the content is displayed in the pop-up window. As the content changes (e.g., due to a selection of existing content within the pop-up window), then the process repeats and the new minimum boundaries for the pop-up window are calculated.

Figure 7:
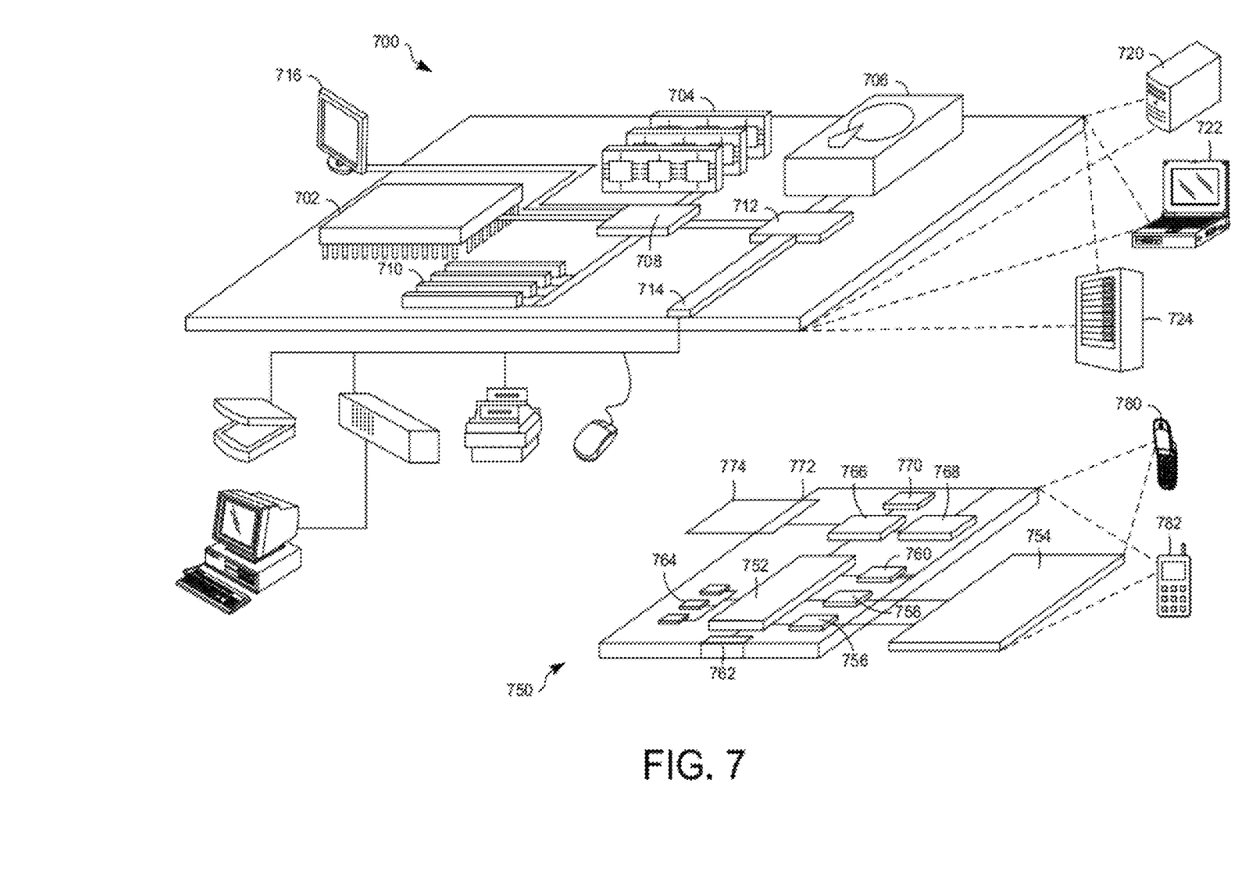
FIG. 7 is a block diagram showing example or representative computing devices and associated elements that may be used to implement the systems and methods of FIGS. 1-6.

FIG. 7 shows an example of a generic computer device 700 and a generic mobile computer device 750, which may be used with the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smart phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method comprising:
   setting minimum boundaries for a pop-up window based on content, wherein the content includes content received from an application installed in a browser application;
   displaying the content in the pop-up window;
   receiving an input to change a layout of the content;
   calculating new minimum boundaries for the pop-up window based on the layout change by populating the content in a non-displayed view to determine the new minimum boundaries;
   resizing the pop-up window using the new minimum boundaries; and
   displaying the content in the resized pop-up window.

2. The computer-implemented method of claim 1 further comprising limiting the minimum boundaries and the new minimum boundaries for the pop-up window to maximum boundaries for the pop-up window.

3. The computer-implemented method of claim 1 wherein resizing the pop-up window and displaying the content in the resized pop-up window includes animating resizing of the pop-up window and displaying the content in the resized pop-up window at a same time.

4. The computer-implemented method of claim 1 wherein receiving the input to change the layout of the content includes receiving a selection to expand content associated with a hyperlink.

5. The computer-implemented method of claim 1 wherein the minimum boundaries and the new minimum boundaries constrain a size of the pop-up window in two dimensions.

6. A computer-readable storage medium having recorded and stored thereon instructions that, when executed by a processor, cause the processor to perform a method, the method comprising:
   setting minimum boundaries for a pop-up window based on content, wherein the content includes content received from an application installed in a browser application;
   displaying the content in the pop-up window;
   receiving an input to change a layout of the content;
   calculating new minimum boundaries for the pop-up window based on the layout change by populating the content in a non-displayed view to determine the new minimum boundaries;
   resizing the pop-up window using the new minimum boundaries; and
   displaying the content in the resized pop-up window.

7. The computer-readable storage medium of claim 6 further comprising limiting the minimum boundaries and the new minimum boundaries for the pop-up window to maximum boundaries for the pop-up window.

8. The computer-readable storage medium of claim 6 wherein resizing the pop-up window and displaying the content in the resized pop-up window includes animating resizing of the pop-up window and displaying the content in the resized pop-up window at a same time.

9. The computer-readable storage medium of claim 6 wherein receiving the input to change the layout of the content includes receiving a selection to expand content associated with a hyperlink.

10. The computer-readable storage medium claim 6 wherein the minimum boundaries and the new minimum boundaries constrain a size of the pop-up window in two dimensions.

11. An apparatus including instructions stored on a computer-readable storage medium and executable by at least one processor to execute a browser application and thereby provide a browser interface, the apparatus comprising:
   a rendering engine configured to cause the at least one processor to set minimum boundaries for a pop-up window based on content and to display the content in the pop-up window, wherein the content includes content received from an application installed in a browser application; and
   an input interface configured to cause the at least one processor to receive an input to change a layout of the content, wherein the rendering engine is configured to cause the at least one processor to:
   calculate new minimum boundaries for the pop-up window based on the layout change by populating the content in a non-displayed view to determine the new minimum boundaries,
   resize the pop-up window using the new minimum boundaries, and
   display the content in the resized pop-up window.

12. The apparatus of claim 11 wherein the rendering engine is configured to cause the at least one processor to limit the minimum boundaries and the new minimum boundaries for the pop-up window to maximum boundaries for the pop-up window.

13. The apparatus of claim 11 wherein the rendering engine is configured to cause the at least one processor to animate resizing of the pop-up window and displaying the content in the resized pop-up window at a same time.

14. The apparatus of claim 11 wherein the input interface is configured to cause the at least one processor to receive a selection to expand content associated with a hyperlink.

15. The apparatus of claim 11 wherein the minimum boundaries and the new minimum boundaries constrain a size of the pop-up window in two dimensions.

16. The computer-implemented method of claim 1 wherein calculating the new minimum boundaries comprises calculating the new minimum boundaries for the pop-up window based on the layout change using a service installed as part of the browser application.

17. The computer-implemented method of claim 1 wherein calculating the new minimum boundaries comprises calculating the new minimum boundaries for the pop-up window based on the layout change independent of code specifying a size.

18. The computer-readable storage medium of claim 6 wherein calculating the new minimum boundaries comprises calculating the new minimum boundaries for the pop-up window based on the layout change using a service installed as part of the browser application.

19. The computer-readable storage medium of claim 6 wherein calculating the new minimum boundaries comprises calculating the new minimum boundaries for the pop-up window based on the layout change independent of code specifying a size.

20. The apparatus of claim 11 wherein the rendering engine is configured to cause the at least one processor to calculate the new minimum boundaries for the pop-up window based on the layout change using a service installed as part of the browser application.

21. The apparatus of claim 11 wherein the rendering engine is configured to cause the at least one processor to calculate the new minimum boundaries for the pop-up window based on the layout change independent of code specifying a size.

* * * * *

UNITED STATES PATENT AND TRADEMARK OFFICE
CERTIFICATE OF CORRECTION

| | | |
|---|---|---|
| PATENT NO. | : 8,266,544 B1 | |
| APPLICATION NO. | : 13/246276 | |
| DATED | : September 11, 2012 | |
| INVENTOR(S) | : Erik Kay et al. | |

It is certified that error appears in the above-identified patent and that said Letters Patent is hereby corrected as shown below:

In the Claims

In column 14, line 13, in claim 10, after "medium" insert -- of --.

Signed and Sealed this
Third Day of June, 2014

Michelle K. Lee
*Deputy Director of the United States Patent and Trademark Office*